(12) United States Patent
Riedl et al.

(10) Patent No.: US 7,007,191 B2
(45) Date of Patent: Feb. 28, 2006

(54) METHOD AND APPARATUS FOR IDENTIFYING ONE OR MORE DEVICES HAVING FAULTS IN A COMMUNICATION LOOP

(75) Inventors: Daniel A. Riedl, Andover, KS (US); James A. Lynn, Rose Hill, KS (US); Anthony D. Gitchell, Derby, KS (US)

(73) Assignee: LSI Logic Corporation, Milpitas, CA (US)

( * ) Notice: Subject to any disclaimer, the term of this patent is extended or adjusted under 35 U.S.C. 154(b) by 614 days.

(21) Appl. No.: 10/226,553

(22) Filed: Aug. 23, 2002

(65) Prior Publication Data

US 2004/0039981 A1 Feb. 26, 2004

(51) Int. Cl.
*G06F 11/00* (2006.01)
*G06F 11/10* (2006.01)
*G06F 11/20* (2006.01)

(52) U.S. Cl. .............................................. 714/4; 714/5
(58) Field of Classification Search .................... 714/4, 714/5
See application file for complete search history.

(56) References Cited

U.S. PATENT DOCUMENTS

| | | | | |
|---|---|---|---|---|
| 4,769,761 A | * | 9/1988 | Downes et al. | 709/224 |
| 5,036,514 A | * | 7/1991 | Downes et al. | 714/704 |
| 6,430,714 B1 | * | 8/2002 | McAdam et al. | 714/704 |
| 2002/0194524 A1 | * | 12/2002 | Wiley et al. | 714/4 |

* cited by examiner

*Primary Examiner*—Stephen M. Baker
(74) *Attorney, Agent, or Firm*—Duft, Bornsen & Fishman, LLP

(57) ABSTRACT

A system identifies one or more devices having faults in a communication loop. The system includes an interface, a decision module, and a connection processor. The interface is configured for sending requests for information to each device of the communication loop and for receiving responses to the requests. The devices may include computer disk drives for use in a storage system. The requests may include Read-Link Status (RLS) commands sent to the computer disk drives. The RLS commands may provide diagnostics of the disk drives connected to the loop. The decision module is communicatively connected to the interface for weighting the responses of each device to identify the devices having the faults. The responses may be weighted based on the relative potential for disrupting operability of the system. The communication loop may include an FC loop that allows communications between a host system and the computer disk drives.

16 Claims, 4 Drawing Sheets

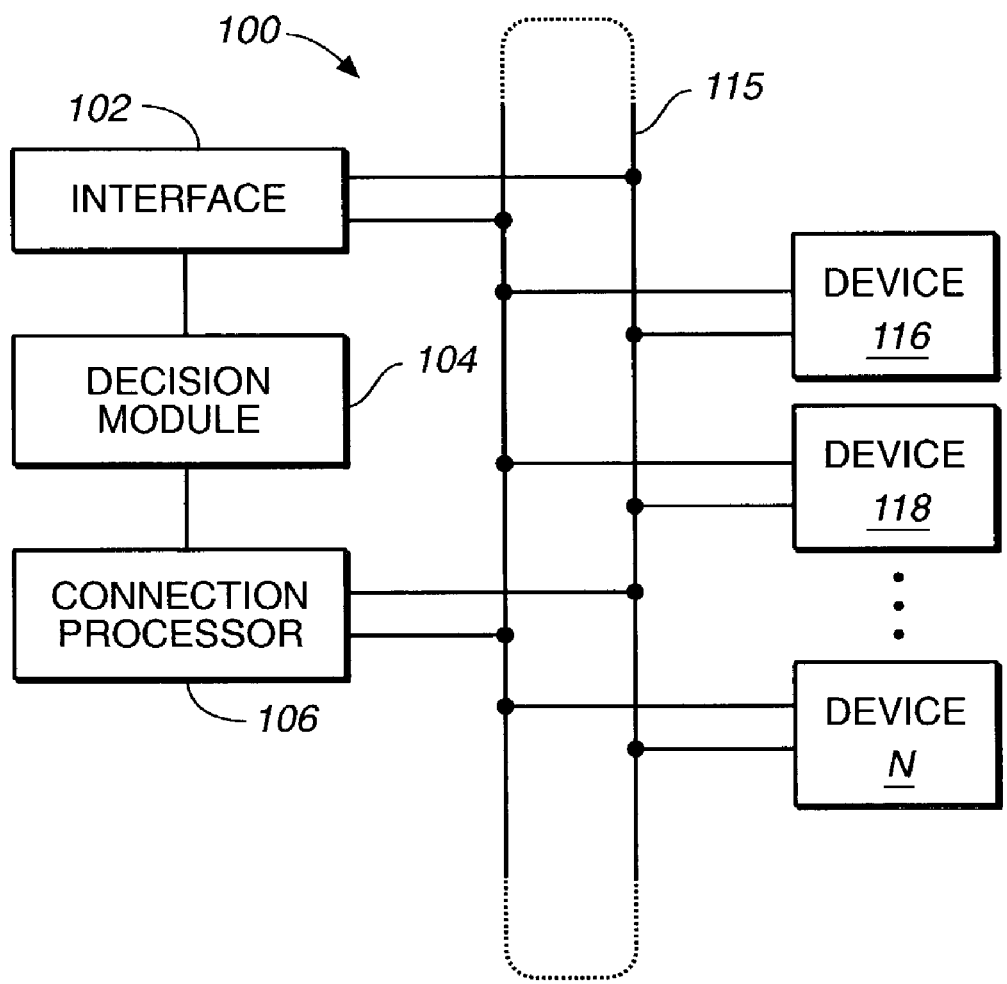
FIG._1

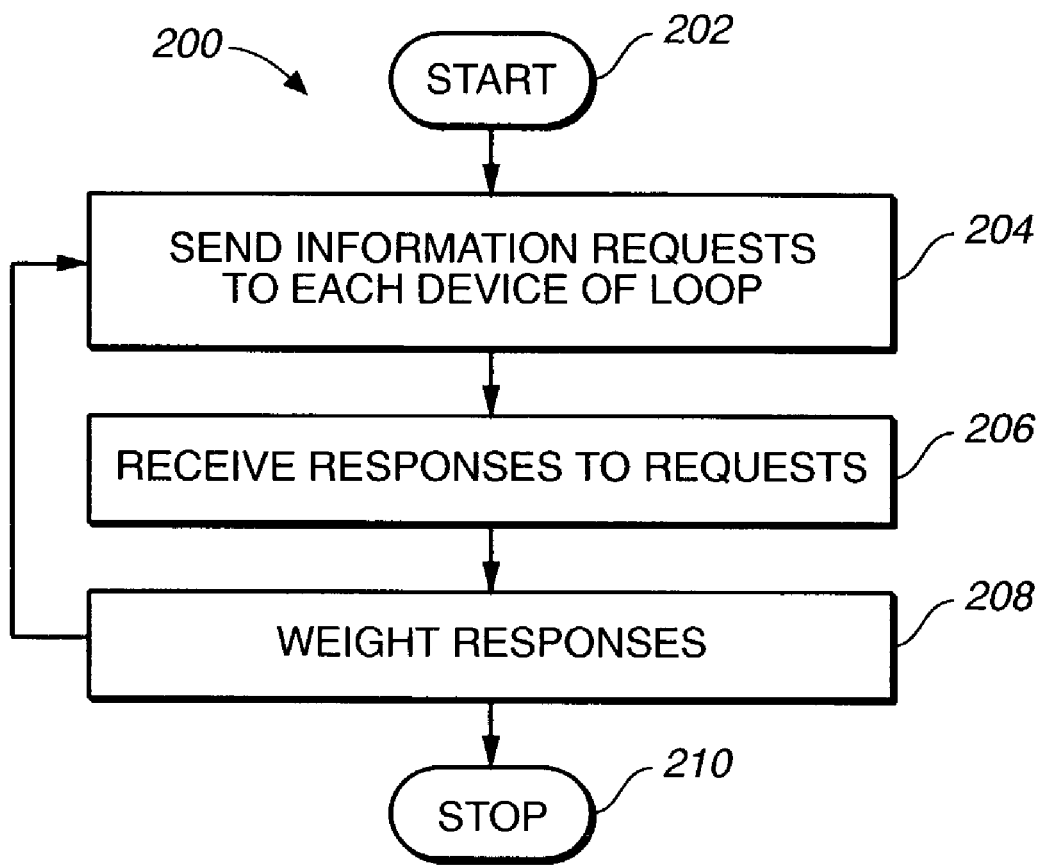
FIG._2

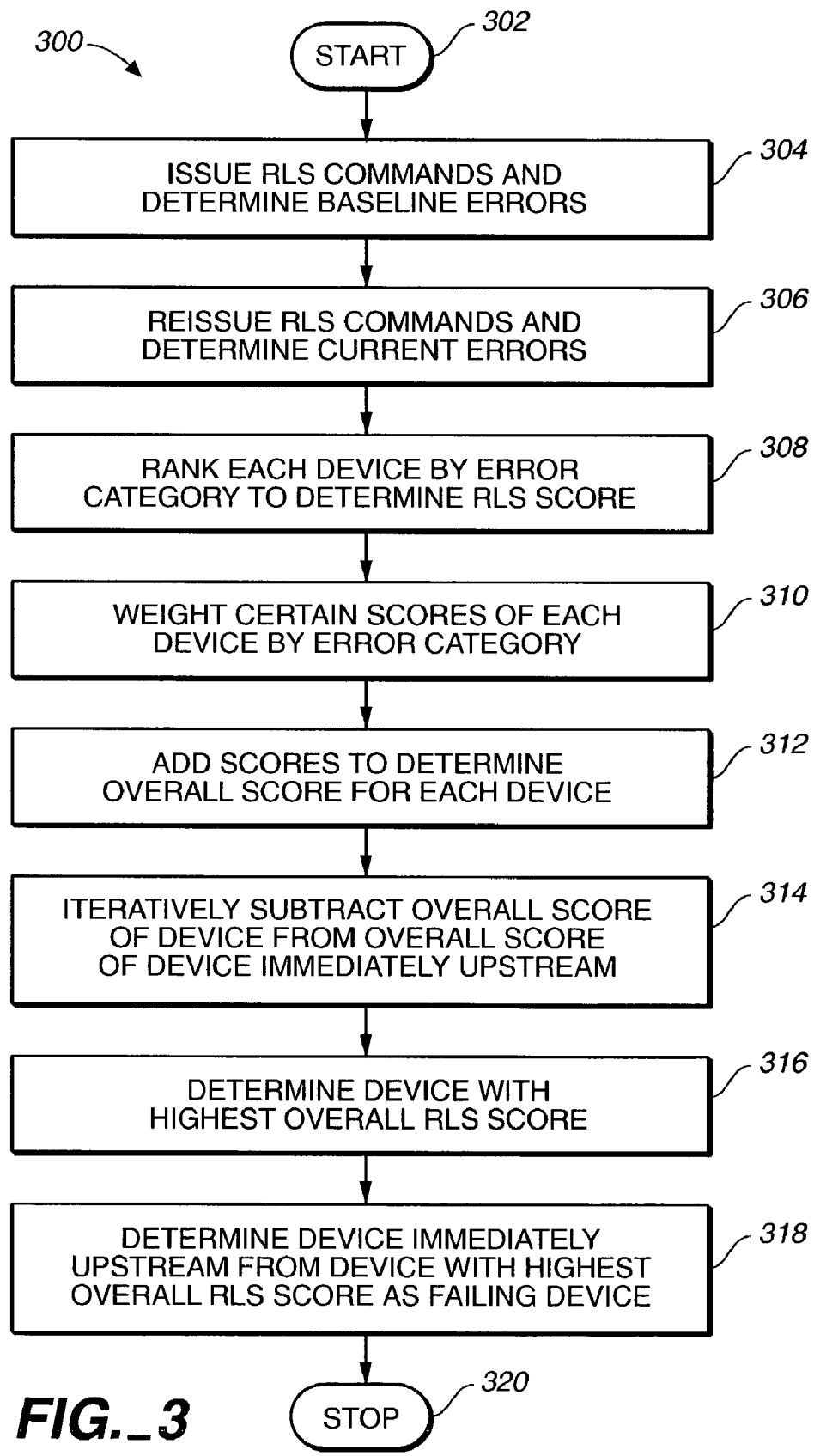
FIG._3

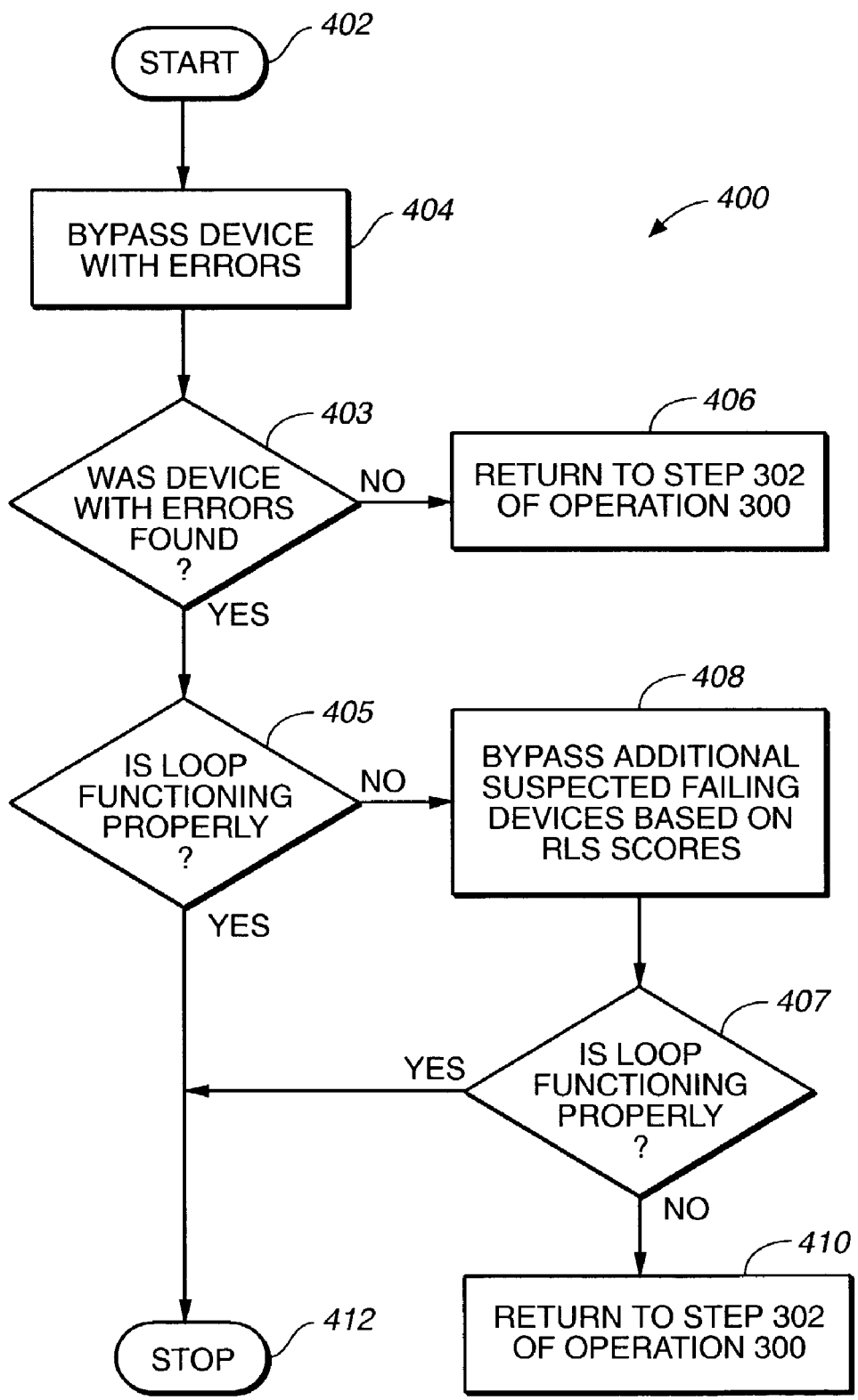
FIG._4

METHOD AND APPARATUS FOR IDENTIFYING ONE OR MORE DEVICES HAVING FAULTS IN A COMMUNICATION LOOP

BACKGROUND OF THE INVENTION

1. Field of the Invention

The present invention is generally directed toward fault detection of one or more devices. More specifically, the present invention relates to identifying faulty devices connected to a storage system communication loop such that the devices may be bypassed.

2. Discussion of Related Art

Many systems functionally include a variety of devices in order to operate. For example, a storage system may include multiple storage devices for storing large amounts of data. In the storage system example, the storage devices and storage controllers are often interconnected through a Fibre Channel (FC) loop. The storage system may be communicatively connected to a host system, such that the host system sends requests to the storage devices through an FC loop. In an FC loop, all devices are interconnected in a "daisy-chained" fashion—each to the next device in a continuous loop topology.

Occasionally, devices of the systems fail to operate according to specified standards of operation. Other devices fail completely and do not function at all, also known as catastrophic failures. When a device is not fully operational or when the device fails completely, the device may impede the operability of the overall system. For example, a failed storage device, such as a computer disk drive, in the storage system may disrupt operations of the other storage devices in the storage system by impeding communications through the FC loop. A failed device, such as the storage device, connected to the FC loop causes the FC loop to become completely non-functional.

When a device is failing and disrupting operations of the system, the device is typically replaced with another. Many systems are designed to allow for rapid replacement of failing devices. For example, many storage systems employ "hot swappable" computer disks that allow a user, such as a system administrator, to simply remove the failing computer disk and replace it with another computer disk. While the failing devices are at times relatively simple to replace, identification of the failing device is much more difficult.

In many environments, a system includes a large number of devices connected to the loop. Identification of a single failing device is at times daunting. For example, the storage system may employ hundreds of computer disks, all of which are operationally connected to the FC loop. In the storage system, if one computer disk fails to function, the entire FC loops becomes non-functional and, as such, so may the storage system. The failed or failing computer disk(s), therefore, must be identified rapidly so as to quickly replace the computer disk(s) and diminish periods of inoperability of the storage system during such a replacement. However, identifying the failed or failing computer disk(s) is a "trial and error" method as presently practiced in the art.

Identifying a failed or failing device through trial and error is an arduous task, particularly so when the system includes many devices, such as the storage system with hundreds of computer disks. The trial and error method consists of removing and reengaging devices one by one until the loop becomes operational. While each drive is temporarily removed, the storage system may be forced to run in a degraded mode of operation depending on the relevance of the removed drive to the ongoing operation of the system. The entire process of removing each device until the failed or failing device is found and reengaging the incorrectly removed devices creates large periods of "down time". Many systems cannot afford the luxury of having such a down time. For example, a traffic management computer system may employ hundreds of computers connected to a central processing system to observe and/or control the flow of many different types of traffic, such as land traffic and air traffic. The central processing system relies heavily on a storage system to maintain data on the traffic and cannot have any portion of the overall system down for any observable length of time. A failed storage system in the traffic management system could create catastrophic collisions within the traffic.

As evident from the above discussion, a need exists for improved structures and methods for identifying faulty devices connected to a storage system communication loop.

SUMMARY OF THE INVENTION

The present invention solves the above and other problems and advances the state of the useful arts by providing an apparatus and a method for identifying one or more devices having faults in a communication loop. More specifically, in one exemplary preferred embodiment, the present invention relates to identifying faulty computer disks connected to an FC loop such that the faulty computer disks might be bypassed, at least temporarily.

In one exemplary preferred embodiment of the invention, a system identifies one or more devices having faults in a communication loop. The devices may include computer disk drives for use in a storage system. The communication loop may include an FC loop that connects to the computer disk drives and allows communications between a host system and the computer disk drives.

The system includes an interface, a decision module, and a connection processor. The interface is configured for sending requests for information to each device of the communication loop and for receiving responses to the requests. The requests may include Read-Link Status (RLS) commands sent to the computer disk drives. The RLS commands may provide diagnostics of the disk drives connected to the loop. For example, a particular disk drive connected to the communication loop may respond with a link status that indicates the error counts for that disk drive when an RLS command is transferred to the disk drive.

In this exemplary preferred embodiment, the decision module is communicatively connected to the interface for generating weighted responses of each device and processing the weighted responses to identify the devices having the faults. For example, the responses to the RLS commands may include multiple categories of error responses, such as link failure, loss of synchronization, loss of signal, primitive sequence protocol error, invalid transmission word, and invalid Cyclic Redundancy Check (CRC). The responses may be weighted based on the relative potential for disrupting operability of the system. Weighting the responses may improve determinations of failed or failing devices as many devices have non-uniform, or non-standard, RLS responses.

Since any one device may disrupt operability of the system, a connection processor may be communicatively connected to the decision module for bypassing the devices having the faults. For example, as the decision module weights the responses received by the interface, it may determine which of the devices is experiencing faults. Once the decision module determines which of the devices is experiencing faults, the connection processor may disable communications with the device, at least temporarily, thereby preventing the device from disrupting the system.

In one aspect of the invention, a method provides for identifying one or more devices having faults in a communication loop. The method includes steps of sending requests for information to each device of the communication loop, receiving responses to the requests, weighting the responses of each device to generate weighted responses of each device, and processing the weighted responses of each device to identify the devices having the faults.

In another aspect of the invention, the step of sending includes a step of issuing a Read Link Status command to each device.

In another aspect of the invention, the method is iteratively performed.

In another aspect of the invention, the step of receiving includes a step of determining error categories of the responses.

In another aspect of the invention, the step of determining error categories includes a step of determining at least one of a link failure, a loss of synchronization, a loss of signal, a primitive sequence protocol error, an invalid transmission word, and an invalid Cyclic Redundancy Check.

In another aspect of the invention, the step of weighting includes a step of assigning values to each of the error categories.

In another aspect of the invention, the method includes a step of determining a baseline of the weighted responses based on the error categories of the responses.

In another aspect of the invention, the method includes a step of bypassing the devices having the faults.

Advantages of the invention include improved fault detection capabilities of devices connected to a storage system communication loop. The improved detection capabilities may improve replacement speed of the faulty devices. Bypassing the faulty devices may also allow usage of the loop until replacement of the devices is performed. Other advantages include a capability of withstanding lack of uniformity in RLS responses.

BRIEF DESCRIPTION OF THE PREFERRED EMBODIMENTS

FIG. 1 is a block diagram illustrating an exemplary preferred embodiment of the invention.

FIG. 2 is a flow chart diagram illustrating an exemplary preferred operation of the invention.

FIG. 3 is a flow chart diagram illustrating another exemplary preferred operation of the invention.

FIG. 4 is a flow chart diagram illustrating an exemplary preferred operation of the invention.

DETAILED DESCRIPTION OF THE PREFERRED EMBODIMENTS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference now to the figures and in particular with reference to FIG. 1, an exemplary preferred embodiment of the invention is shown in system 100. System 100 is configured to identify which of devices 116, 118 . . . N is having faults. Each of devices 116, 118 . . . N may be connected to communication loop 115. Devices 116, 118 . . . N may include computer disk drives. System 100 may, therefore, additionally operate as a storage system. Communication loop 115 may include an FC loop that connects to the computer disk drives and allows communications between a host system and the computer disk drives. Identification of a failed or failing device of devices 116, 118 . . . N may assist in maintaining operability of system 100.

System 100 includes interface 102 and decision module 104 in an exemplary preferred embodiment of the invention. Additionally, system 100 may include connection processor 106. Interface 102 is configured for sending requests for information to each of devices 116, 118 . . . N. Interface 102 may also be configured for receiving responses to the requests from each of devices 116, 118 . . . N. The requests may include Read-Link Status (RLS) commands sent to the computer disk drives (e.g. devices 116, 118 . . . N). The RLS commands may provide diagnostics of the disk drives connected to communication loop 115. For example, device 116 connected to loop 115 may respond with a link status that indicates a number of errors occurring with device 116 when an RLS command is transferred to device 116.

In the exemplary preferred embodiment, decision module 104 is communicatively connected to interface 102 for generating weighted responses of each of devices 116, 118 . . . N and processing the weighted responses to identify which of devices 116, 118 . . . N may be experiencing faults. For example, the responses to the RLS commands may include multiple categories of error responses, such as link failure, loss of synchronization, loss of signal, primitive sequence protocol error, invalid transmission word, and invalid CRC. The responses may be weighted based on the relative potential for disrupting operability of system 100. Weighting the responses may improve determinations of failed or failing devices of devices 116, 118 . . . N as many devices have non-uniform, or non-standard, RLS responses.

In system 100, any one of devices 116, 118 . . . N may disrupt operability of system 100 as communication loop 115 may include an FC loop. FC loops are susceptible to disrupting operations of system 100 when any one of devices 116, 118 . . . N becomes inoperative. In system 100, connection processor 106 may be communicatively connected to decision module 104 for bypassing the devices of devices 116, 118 . . . N having the faults. For example, as decision module 104 weights the responses received by the interface, it may determine which of devices 116, 118 . . . N is experiencing faults. Once decision module 104 determines which of devices 116, 118 . . . N is experiencing faults, connection processor 106 may disable communications with the device(s) of devices 116, 118 . . . N having the faults, thereby preventing the device(s) from disrupting operability of system 100.

In one exemplary preferred embodiment of the invention, interface 102 sends RLS commands to each of devices 116, 118 . . . N. Interface 102 may receive responses to the RLS commands from each of devices 116, 118 . . . N to determine a baseline of RLS data. After a predetermined time period, interface 102 may reissue the RLS commands and receive receives responses to the reissued RLS commands. The time period may be determined by the functionality of loop 115. For example, the time period for sending the RLS commands for a non-functional loop 115 may be 5 seconds or less. The time interval for sending the RLS commands for a marginally functional loop 115 may be 24 hours or longer. The RLS data of the responses to the reissued RLS commands may be compared to the baseline of the RLS data.

In the exemplary preferred embodiment, decision module 104 may determine malfunctioning devices of devices 116, 118 . . . N based on relative increases in RLS counts of the responses. Decision module 104 may assign values to devices 116, 118 . . . N based on the categories of the responses to determine point value increases in responses from the each of devices 116, 118 . . . N. For example, a device having the largest number of invalid transmission word responses may be assigned a value of 10, a device having the second largest number of invalid transmission word responses may be assigned a value of 9, and continuing for each of devices 116, 118 . . . N. Decision module 104 may assign similar values to each of devices 116, 118 . . . N based on the other categories of the responses, such as link failure, loss of synchronization, loss of signal, primitive sequence protocol error, and invalid CRC. Additionally, decision module may weight each of devices 116, 118 . . . N having the error categories of link failure, loss of synchronization, and loss of signal by a scale factor, as these error categories may indicate sources of probable failures affecting the functionality of loop 115.

Since errors are likely to be passed between each of devices 116, 118 . . . N, decision module 104 may subtract an overall score of one of devices 116, 118 . . . N from another of devices 116, 118 . . . N. After subtracting, decision module 104 may determine the device having the highest point value to ascertain the device having the errors of devices 116, 118 . . . N. The device having the errors may be located immediately adjacent to the device having the highest point value in loop 115. Upon determining the device having the errors, connection processor 106 may bypass the device. Interface 102 may then reissue the RLS commands to ascertain communication improvement on link 115. If communications have not improved, interface 102, decision module 104, and connection processor 106 may iteratively perform their respectively assigned functions to determine the failing device.

FIG. 2 illustrates exemplary preferred operation 200 of system 100 of FIG. 1. Operation 200 commences, in step 202. Interface 104 sends requests for information to each of devices 116, 118 . . . N connected to loop 115, in step 204. The requests may include RLS commands. Interface 104 receives responses to the requests, in step 206. Decision module 208 weights the responses of each device to identify the devices having the faults, in step 208. Operation 200 ends in step 210.

FIG. 3 illustrates another exemplary preferred embodiment of system 100 in operation 300. Operation 200 commences, in step 302. Interface 102 may issue RLS commands and determine a baseline of errors from the responses of devices 116, 118 . . . N connected to loop 115, in step 304. After a predetermined time period, interface 102 may reissue the RLS commands to determine current errors in each of devices 116, 118 . . . N, in step 306. Each of devices 116, 118 . . . N may include a computer disk drive and loop 115 may include an FC loop. Decision module 104 may rank each of devices 116, 118 . . . N by error category to determine RLS scores, in step 308. Decision module 310 may then weight certain scores of devices 116, 118 . . . N by certain error categories. For example, error categories of link failure, loss of synchronization, and loss of signal may be scale an RLS score by a factor of 3. Decision module 104 may add the RLS scores of each of devices 116, 118 . . . N to determine overall RLS scores for each device, in step 312.

Decision module 104 may then iteratively subtract the overall score of a particular device from the overall score of a device immediately upstream, in step 314. Devices upstream may be identified as devices transmitting data and/or errors downstream to other of devices 116, 118 . . . N connected to loop 115. Therefore, subtracting overall scores of particular devices from devices upstream may identify the failed or failing devices by propagating the higher overall scores up stream. Decision module 104 may then determine which of devices 116, 118 . . . N has the highest overall RLS score, in step 316. Decision module 104 may proceed to determine the device immediately upstream from the device having the highest RLS score as the failed or failing device connected to loop 115, in step 318. Operation 300 ends in step 320.

FIG. 4 illustrates another exemplary preferred embodiment of system 100 in operation 400. Operation 200 commences, in step 402. Connection processor 106 bypasses the failed or failing device of devices 116, 118 . . . N, in step 404. Decision module 104 may determine if the failed or failing device of devices 116, 118 . . . N has been found, in decision block 403. If the failed or failing device has been found, decision module 104 may determine if loop 115 is functioning properly, in decision block 405. If the failed or failing device has not been found, decision module 104 may return to step 302 of operation 300, in step 406. If loop 115 is function properly (e.g. substantially without errors), operation 400 ends in step 412. If loop 115 is not functioning properly (e.g. devices remain that are failed or failing within devices 116, 118 . . . N), decision module 104 may bypass additional suspected failing devices based on determinations of RLS scores of the suspected devices. Decision module 104 may then determine if loop 115 is functioning properly, in decision block 407. If loop 115 is still not functioning properly, decision module 104 may return to step 302 of operation 300, in step 410. If loop 115 is functioning properly, operation 400 ends in step 412.

Those skilled in the art will understand that other methods can be used to detect and bypass failed or failing devices connected to a communication loop that fall within the scope of the invention.

Instructions that perform the operations of FIGS. 2–4 can be stored on storage media. The instructions can be retrieved and executed by a microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media.

Advantages of the invention include improved fault detection capabilities of devices connected to a storage system communication loop. The improved detection capabilities may improve replacement speed of the faulty devices. Bypassing the faulty devices may also allow usage of the loop until replacement of the devices is performed. Other advantages include a capability of withstanding lack of uniformity in RLS responses.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed:

1. A method of identifying one or more devices having faults in a communication loop, including steps of:
   sending requests for information to each device of the communication loop;
   receiving responses to the requests;
   said step of receiving further includes a step of determining error categories from the responses of each device;
   weighting the responses of each device to generate weighted responses of each device;
   determining a baseline of weighted responses for each device based on the error categories of the responses of each device; and
   processing the weighted responses of each device and comparing the weighted responses of each device to the baseline of each device to identify the devices having the faults.

2. The method of claim 1, wherein the step of sending includes a step of issuing a Read Link Status command to each device.

3. The method of claim 1, wherein the method is iteratively performed.

4. The method of claim 1, wherein the step of determining error categories includes a step of determining at least one of a link failure, a loss of synchronization, a loss of signal, a primitive sequence protocol error, an invalid transmission word, and an invalid Cyclic Redundancy Check.

5. The method of claim 1, wherein the step of weighting includes a step of assigning values to each of the error categories.

6. The method of claim 1, further including a step of bypassing the devices having the faults.

7. A system for identifying one or more devices having faults in a communication loop, including:
   an interface configured for sending requests for information to each device of the communication loop and for receiving responses to the requests of each device; and
   a decision module communicatively connected to the interface for generating weighted responses of each device and error category of the response, determining a baseline for the weighted responses for each device based on error category, and processing the weight responses of each device and comparing the weighted responses of each device to the baseline of each device to identify the devices having the faults.

8. The system of claim 7, further including a connection processor communicatively connected to the decision module for bypassing the devices having the faults.

9. The system of claim 7, wherein at least one of the devices includes a storage device.

10. The system of claim 7, wherein the communication loop includes a fibre channel.

11. A system for identifying one or more devices having faults in a communication loop, including:
    means for sending requests for information to each device of the communication loop;
    means for receiving responses to the requests;
    means within said receiving means for determining error categories from the responses of each device;
    means for weighting the responses of each device to generate weighted responses of each device;
    means for determining a baseline of the weighted responses for each device based on the error categories of the responses; and
    means for processing the weighted responses of each device and comparing the weighted responses of each device to the baseline of each device to identify the devices having the faults.

12. The system of claim 11, wherein the means for sending includes means for issuing a Read Link Status command to each device.

13. The system of claim 11, further including means for iteratively controlling the means for sending, receiving, and weighting.

14. The system of claim 11, wherein the means for determining error categories includes means for determining at least one of a link failure, a loss of synchronization, a loss of signal, a primitive sequence protocol error, an invalid transmission word, and an invalid Cyclic Redundancy Check.

15. The system of claim 11, wherein the means for weighting includes means for assigning values to each of the error categories.

16. The system of claim 11, further including means for bypassing the devices having the faults.

* * * * *